United States Patent
Kiwada

(10) Patent No.: US 7,450,253 B2
(45) Date of Patent: Nov. 11, 2008

(54) IMAGE FORMING DEVICE, IMAGE FORMING METHOD, IMAGE FORMING PROGRAM, COMPUTER READABLE RECORDING MEDIUM ON WHICH THE PROGRAM IS RECORDED

(75) Inventor: Masakatsu Kiwada, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 987 days.

(21) Appl. No.: 10/802,814

(22) Filed: Mar. 18, 2004

(65) Prior Publication Data

US 2005/0162697 A1  Jul. 28, 2005

(30) Foreign Application Priority Data

Jan. 22, 2004  (JP) ............................. 2004-014342

(51) Int. Cl.
  *G06F 15/00*  (2006.01)
(52) U.S. Cl. .................. 358/1.14; 358/1.12; 358/1.16; 358/453; 235/375; 235/382; 235/462.01; 235/492; 235/494
(58) Field of Classification Search ............... 358/1.12, 358/1.14, 1.16, 453; 235/375, 382, 462.01, 235/492, 494
See application file for complete search history.

(56) References Cited

U.S. PATENT DOCUMENTS

| | | | |
|---|---|---|---|
| 6,585,154 B1 * | 7/2003 | Ostrover et al. | 235/375 |
| 6,674,923 B1 * | 1/2004 | Shih et al. | 382/305 |
| 6,827,279 B2 * | 12/2004 | Teraura | 325/492 |

FOREIGN PATENT DOCUMENTS

| | | |
|---|---|---|
| JP | 08-230254 | 9/1996 |
| JP | 08-238814 | 9/1996 |
| JP | 08-282023 | 10/1996 |
| JP | 10-334215 | 12/1998 |
| JP | 2000-285203 | 10/2000 |
| JP | 2001-024845 | 1/2001 |
| JP | 2001024845 A * | 1/2001 |
| JP | 2002-209039 | 7/2002 |
| JP | 2002-337426 | 11/2002 |

\* cited by examiner

*Primary Examiner*—Edward L. Coles
*Assistant Examiner*—Chan S Park
(74) *Attorney, Agent, or Firm*—Finnegan, Henderson, Farabow, Garrett & Dunner LLP

(57) ABSTRACT

MFP 100A reads attribute information from an IC tag of a document related to IC tagged printed matter set on ADF 141 by means of IC tag reader 143A, displays modifiable attribute information on control unit 130, and receives an input of modification instruction. Next, it reads image data from an IC tag of the document by IC tag reader 143A and receives an instruction input on which of the attribute information and image data, either before or after the modification, is to be written on the IC tag of the IC tag printing paper. It prints the modified image data on the IC-tagged printing paper based on the attribute information after the modification by means of printing unit 151 and writes on the IC tag of the printing paper the attribute information and the image data, either before or after the modification, according to said instruction. This makes it possible to retain the attribute information and the original image data even after the printing on the IC tagged printing paper by modifying the attribute information of the document.

9 Claims, 15 Drawing Sheets

310 {
<HEADDER>
<DOCUMENT ID>000001</DOCUMENT ID>
<PAGE NUMBER>1</PAGE NUMBER>
<COPYING PERMISSION>YES</COPYING PERMISSION>
<MODIFIABLE ATTRIBUTE>COLOR, RESOLUTION, FONT SIZE, FONT COLOR, FONT TYPE</MODIFIABLE ATTRIBUTE>
</HEADDER>

320 {
<IMAGE DATA>
<COLOR>FULL COLOR</COLOR>
<RESOLUTION>600 dpi</RESOLUTION>
<FONT SIZE>72 pt</FONT SIZE>
<FONT COLOR>RED</FONT COLOR>
<FONT TYPE>GOTHIC</FONT TYPE>
ABC
</IMAGE DATA>

THIS DOCUMENT HAS AN IC TAG. THE IC TAG STORES THE ORIGINAL IMAGE DATA OF THE DOCUMENT. PRINTING OF HIGH IMAGE QUALITY CAN BE OBTAINED IF THE ORIGINAL IMAGE DATA IS USED. HOWEVER, THE PORTION ADDED BY HANDWRITING WILL BE LOST.

DO YOU WANT TO USE THE ORIGINAL IMAGE DATA STORED IN THE IC TAG.

| YES | NO |

THE ORIGINAL IMAGE DATA IN THE IC TAG CONTAINS THE FOLLOWING MODIFIABLE ATTRIBUTE INFORMATION.

MODIFIABLE INFORMATION

- COLOR
- RESOLUTION
- FONT SIZE
- FONT COLOR
- FONT TYPE

DO YOU WANT TO MODIFY THE ATTRIBUTE INFORMATION?

| YES | NO |

PLEASE SPECIFY THE PARAMETERS OF ATTRIBUTE INFORMATION TO BE MODIFIED.

- COLOR         FULL COLOR  —>  MONOCHROMATIC, GRAY SCALE, FULL COLOR ......
- RESOLUTION    600 dpi     —>  100, 200, 300, 600, ......
- FONT SIZE     72 pt       —>  10, 12, 16, 20, 36, 72, ......
- FONT COLOR    RED         —>  BLACK, BLUE, GREEN, YELLOW, ORANGE, RED, ......
- FONT TYPE     GOTHIC      —>  GOTHIC, P GOTHIC, MINCHO, ...

[COMPLETE]

```
<HEADDER>
<DOCUMENT ID>000001</DOCUMENT ID>
<PAGE NUMBER>1</PAGE NUMBER>
<COPYING PERMISSION>YES</COPYING PERMISSION>
<MODIFIABLE ATTRIBUTE>COLOR, RESOLUTION, FONT SIZE, FONT COLOR, FONT TYPE</MODIFIABLE ATTRIBUTE>
</HEADDER>
<IMAGE DATA>
<COLOR>GRAY SCALE </COLOR>
<RESOLUTION>200 dpi</RESOLUTION>
<FONT SIZE>72 pt</FONT SIZE>
<FONT COLOR>RED</FONT COLOR>
<FONT TYPE>P GOTHIC</FONT TYPE>
ABC
</IMAGE DATA>
```

```
<HEADDER>
<DOCUMENT ID>000001</DOCUMENT ID>
<PAGE NUMBER>1</PAGE NUMBER>
<COPYING PERMISSION>YES</COPYING PERMISSION>
<MODIFIABLE ATTRIBUTE>COLOR, RESOLUTION, FONT SIZE, FONT COLOR,
FONT TYPE</MODIFIABLE ATTRIBUTE>
</HEADDER>
<IMAGE DATA>
<DIFFERENT ATTRIBUTE>COLOR, RESOLUTION, FONT TYPE
</DIFFERENT ATTRIBUTE>
<COLOR>FULL COLOR</COLOR>
<RESOLUTION>600 dpi</RESOLUTION>
<FONT SIZE>72 pt</FONT SIZE>
<FONT COLOR>RED</FONT COLOR>
<FONT TYPE>GOTHIC</FONT TYPE>
ABC
</IMAGE DATA>
```

| FONT TYPE | FOR FEE/FREE OF CHARGE | FONT DATA EXISTS OR DO NOT EXIST |
|---|---|---|
| GOTHIC | FREE OF CHARGE | EXISTS |
| P GOTHIC | FREE OF CHARGE | EXISTS |
| MINCHO | FREE OF CHARGE | EXISTS |
| P MINCHO | FREE OF CHARGE | EXISTS |
| ROUNDED GOTHIC | FOR FEE | DO NOT EXIST |
| ⋮ | ⋮ | ⋮ |

IMAGE FORMING DEVICE, IMAGE FORMING METHOD, IMAGE FORMING PROGRAM, COMPUTER READABLE RECORDING MEDIUM ON WHICH THE PROGRAM IS RECORDED

This application is based on Japanese Patent Application No. 2004-014342 filed on Jan. 22, 2004, the contents of which are hereby incorporated by reference.

BACKGROUND OF THE INVENTION

1. Field of the Invention

The invention relates to a printed matter equipped with an electronic tag and an image forming device for copying them or other purposes, in particular, a electronically tagged printed matter and an image forming device capable of allowing the user to use attribute information of the printed matter or original image data during copying.

2. Description of Related Art

Printed matters that hold the attribute information thereof on themselves by using printing paper with an IC tag, which is embedded in a certain part of printing paper, and image forming devices that allow the users to use the attribute information by reading it from the IC tag during the printing process have been known (e.g., JP-2001-24845A). These printing matters and devices are capable of providing outputs that reflect attribute information of the printed matters during copying, for example, overlaying noises on printed matters when there is information that prohibits copying. However, since said printed matters and devices are based on the optical copying technology, there are inherent problems, e.g., deterioration of images of copies.

Various image forming devices that read identifiers attached to the printed matter when copying the printed matter, and download from a server corresponding original image data for printing (e.g., JP-2002-209039A). Such devices can maintain image quality on copies equivalent to that of the original printed matter as the original image data for the printed matter can be used on copies. However, said devices can be used only under environments where dedicated servers, networks and other facilities are built in.

In the meanwhile, certain recording media such as IC cards have been known wherein image data recorded on said recording media are printed on the surfaces of the substrates (e.g., JP-10-334215A). However, the image on the surfaces of the substrates of those recording media are printed simply for the purpose of easy visual recognitions of the image data recorded on said recording media, and they don't have sufficient characteristics for being distributed as printed matters or to be copied.

SUMMARY OF THE INVENTION

As a means of solving the above mentioned problems of the prior art, the applicant of the present invention is filing simultaneously a patent application for an electronically tagged printed matter that is capable of keeping the attribute information and original image data of printed matter on the printed matter themselves using IC-tagged printing paper wherein an IC tag is embedded in certain parts of the printing paper as well as an image forming device that is capable of reading out and using the attribute information and original image data of the printed matter from the IC tag during the copying process of such a printed matter. Using such a device and a printed matter makes it possible to use during the copying process the attribute information and original image data of the printed matter held on the printed matter themselves, so that copies of high image quality reflecting the attribute information can be obtained. However, when printing is performed on IC-tagged printing paper in said device by modifying attribute information of an IC-tagged document concerning said printed matter, there is a problem that some of the attribute information and the original image data are not maintained and lost as the modified attribute information and image data are written on the IC tag of the printing paper.

The invention is therefore intended for providing an image forming device capable of reading out and using attribute information and original image data of an electronically tagged printed matter from the electronic tag during the copying process of said printed matter, in particular, image forming device capable of maintaining the attribute information of the document and the original image data even when printing is performed on IC-tagged printing paper modifying the attribute information of the document.

Said objective of the present invention can be accomplished by the following means:

(1) An image forming device, comprising: an attribute information reading unit for reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a display unit for displaying modifiable items among attribute information read out by said attribute information reading unit; an attribute information modifying unit for modifying attribute information displayed by said display unit; an image reading unit for reading out the image data from the electronic tag of said electronically tagged printed matters; an image data modifying unit for modifying the image data read out by said image data reading unit based on the attribute information modified by said attribute information modifying unit; a printing unit for printing the image data modified by said image data modifying unit on an electronically tagged printing paper equipped with an electronic tag for storing electronic data in a certain part of the printing paper; and a writing unit for writing the attribute information read out by said attribute information reading unit and the image data read out by said image data reading unit on the electronic tag of the electronically tagged printing paper on which the image data is printed by said printing unit.

(2) An image forming method, comprising: an attribute information reading step of reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a display step of displaying modifiable items among attribute information read out by said attribute information reading step; an attribute information modifying step of modifying attribute information displayed by said display step; an image reading step of reading out the image data from the electronic tag of said electronically tagged printed matters; an image data modifying step of modifying the image data read out by said image data reading step based on the attribute information modified by said attribute information modifying step; a printing step of printing the image data modified by said image data modifying step on an electronically tagged printing paper equipped with an electronic tag for storing electronic data in a certain part of the printing paper; and a writing step of writing the attribute information read out by said attribute information reading step and the image data read out by said image data reading step on the electronic tag of the electronically tagged printing paper on which the image data is printed by said printing step.

(3) An image forming program for causing an image forming device to execute: an attribute information reading step of reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag; a display step of displaying modifiable items among attribute information read out by said attribute information reading step; an attribute information modifying step of modifying attribute information displayed by said display step; an image reading step of reading out the image data from the electronic tag of said electronically tagged printed matters; an image data modifying step of modifying the image data read out by said image data reading step based on the attribute information modified by said attribute information modifying step; a printing step of printing the image data modified by said image data modifying step on an electronically tagged printing paper equipped with an electronic tag for storing electronic data in a certain part of the printing paper; and a writing step of writing the attribute information read out by said attribute information reading step and the image data read out by said image data reading step on the electronic tag of the electronically tagged printing paper on which the image data is printed by said printing step.

(4) A computer readable recording medium on which the image forming program as described in (3) is recorded.

(5) An image forming device, comprising: a reading unit for reading out image data from an electronic tag of an electronically tagged printed matter wherein image data is printed on an electronically tagged printing paper equipped with an electronic tag for storing electronic data in a certain part of the printing paper and said electronic tag stores image data printed on said electronically tagged printing paper; a detecting unit for detecting font information from the image data read out by said reading unit; a judging unit for judging whether the font related to the detected font information is available for a fee or free of charge when the font information is detected by said detecting unit; a printing unit for printing the image data read out by said reading unit on an electronically tagged printing paper equipped with an electronic tag for storing electronic data on a certain part of the printing paper; and a writing unit for writing the image data printed by said printing unit on the electronic tag of the electronically tagged printing paper on which the image data is printed by said printing unit, wherein said writing unit does not write the font data related to said font information on the electronic tag of the electronically tagged printing paper on which the image data is printed by said printing unit, when it is judged by said judging unit that the font of said font information is available for a fee.

(6) An image forming method, comprising: a reading step of reading out image data from an electronic tag of an electronically tagged printed matter wherein image data is printed on an electronically tagged printing paper equipped with an electronic tag for storing electronic data in a certain part of the printing paper and said electronic tag stores image data printed on said electronically tagged printing paper; a detecting step of detecting font information from the image data read out by said reading step; a judging step of judging whether the font related to the detected font information is available for a fee or free of charge when the font information is detected by said detecting step; a printing step of printing the image data read out by said reading step on an electronically tagged printing paper equipped with an electronic tag for storing electronic data on a certain part of the printing paper; and a writing step of writing the image data printed by said printing step on the electronic tag of the electronically tagged printing paper on which the image data is printed by said printing step, wherein said writing step does not write the font data related to said font information on the electronic tag of the electronically tagged printing paper on which the image data is printed by said printing step, when it is judged by said judging step that the font of said font information is available for a fee.

(7) An image forming program for causing an image forming device to execute: a reading step of reading out image data from an electronic tag of an electronically tagged printed matter wherein image data is printed on an electronically tagged printing paper equipped with an electronic tag for storing electronic data in a certain part of the printing paper and said electronic tag stores image data printed on said electronically tagged printing paper; a detecting step of detecting font information from the image data read out by said reading step; a judging step of judging whether the font related to the detected font information is available for a fee or free of charge when the font information is detected by said detecting step; a printing step of printing the image data read out by said reading step on an electronically tagged printing paper equipped with an electronic tag for storing electronic data on a certain part of the printing paper; and a writing step of writing the image data printed by said printing step on the electronic tag of the electronically tagged printing paper on which the image data is printed by said printing step, wherein said writing step does not write the font data related to said font information on the electronic tag of the electronically tagged printing paper on which the image data is printed by said printing step, when it is judged by said judging step that the font of said font information is available for a fee.

(8) A computer readable recording medium on which the image forming program as described in (7) is recorded.

BRIEF DESCRIPTION OF THE DRAWINGS

FIG. 4 is a diagram for describing electronic data recorded on an IC tag 212 of IC-tagged document 200.

FIG. 8 is an example screen to be displayed on a touch panel of operating unit 130 of MFP 100A.

FIG. 9 is an example screen to be displayed on a touch panel of operating unit 130 of MFP 100A.

FIG. 10 is an example screen to be displayed on a touch panel of operating unit 130 of MFP 100A.

FIG. 13 is a diagram for describing the contents of electronic data recorded on an IC tag of IC-tagged printing paper.

FIG. 14 is a diagram for describing the contents of electronic data recorded on an IC tag of IC-tagged printing paper.

FIG. 18 is a diagram showing an example of font information table stored on memory unit 120 of MFP 100B.

DESCRIPTION OF THE PREFERRED EMBODIMENTS

The preferred embodiments of the invention will be described in detail below with reference to the accompanying drawings.

Figure 1:
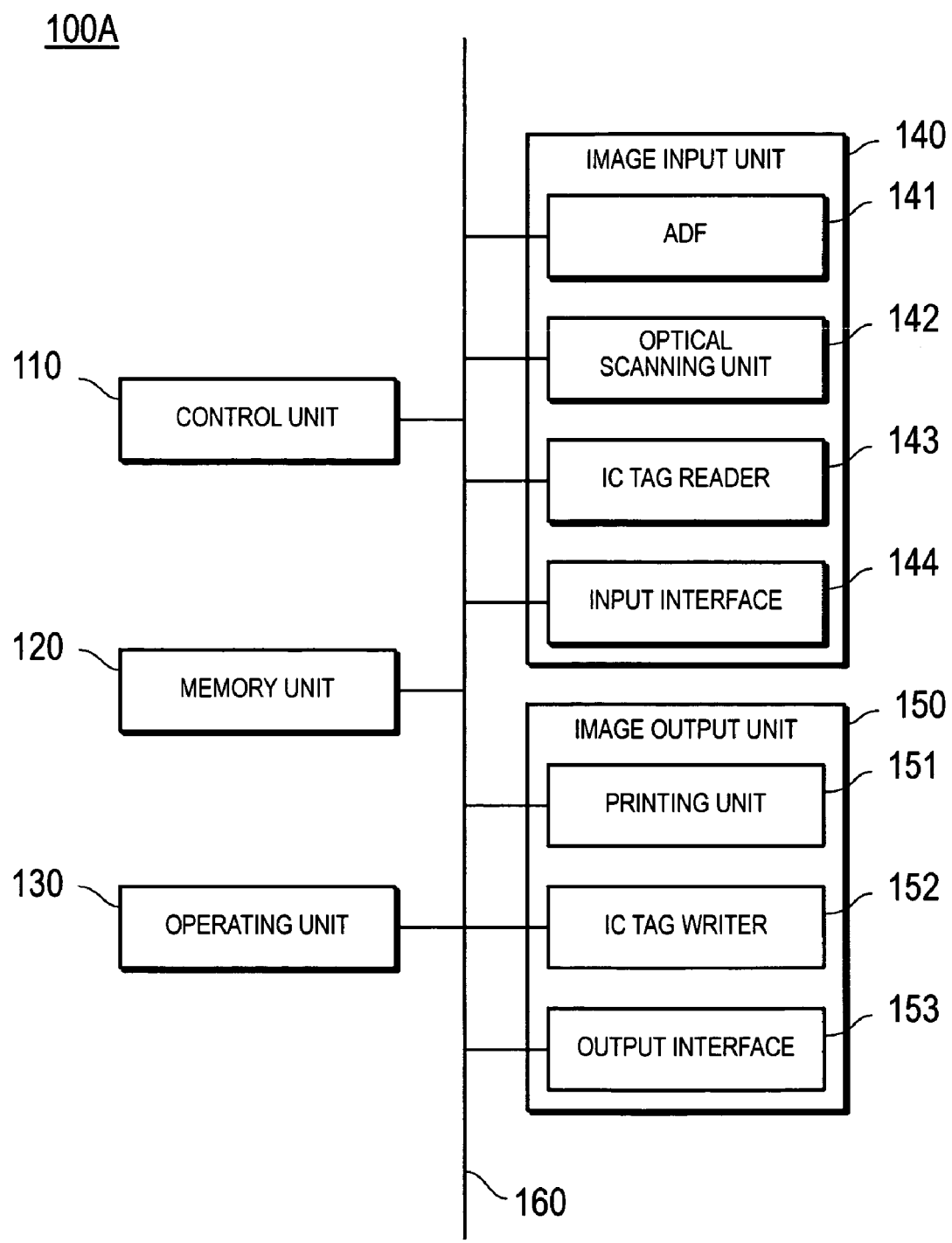
FIG. 1 is a block diagram showing the constitution of MFP 100A according to a first embodiment of the invention.
Figure 2:
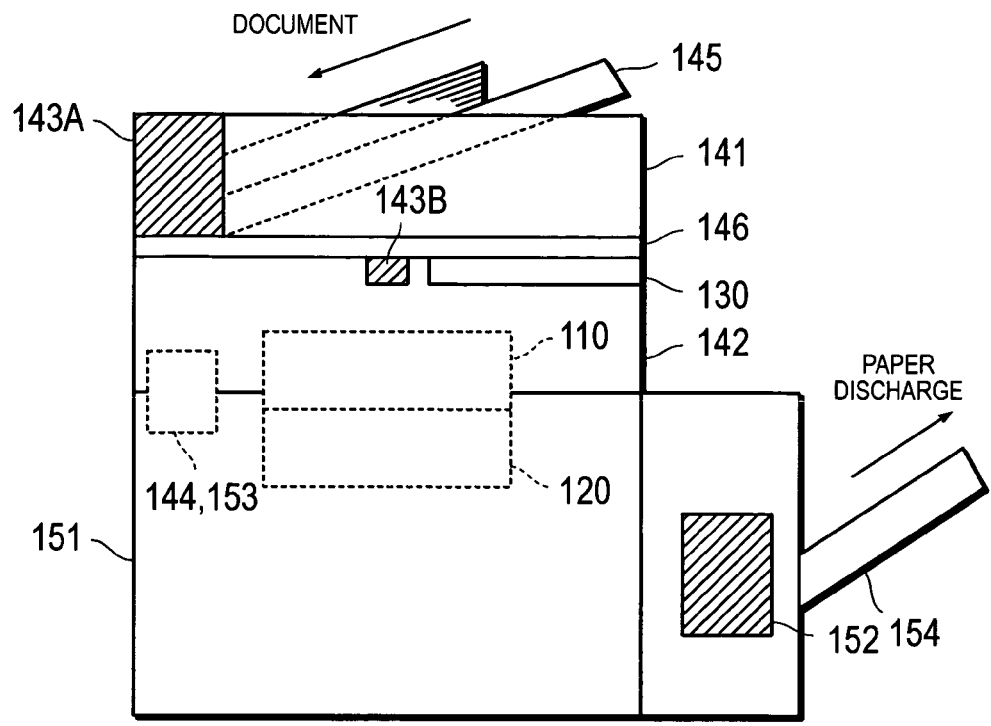
FIG. 2 is a block diagram showing the constitution of MFP 100A.

FIG. 1 and FIG. 2 are the block diagram and the schematic diagram of MFP (Multiple Function Peripheral) 100 as an image forming device of the first embodiment of the present invention. As can be seen from FIG. 1 and FIG. 2, MFP 100 is equipped with a control unit 110, a memory unit 120, an operating unit 130, an image input unit 140, and an image output unit 150, all of which are interconnected to exchange signals with each other via bus 160.

The control unit 110 is a CPU, and controls various parts indicated above and executes various arithmetic processes according to a program.

The memory unit 120 includes a ROM for storing various programs and parameters, a RAM for temporarily storing programs and data, a hard disk used for storing various programs and data, or temporarily storing image data obtained from image processing, and others.

Operating unit 130 consists of a touch panel for displaying various information and entering various setup inputs, a ten key pad for setting up the number of copies to make and others, a start key for instructing the start of operation, a stop key for instructing the operation to stop, various fixed keys such as a reset key for initializing various setup conditions, indicator lamps, etc.

Image input unit 140 consists of an ADF (Auto Document Feeder) 141, an optical scanning unit 142, an IC tag reader 143, an input interface 144, etc.

ADF 141 transports a single or multiple sheets of paper set on document tray 145, transports them one sheet at a time to a specified scanning position of document table 146, and discharges the document sequentially after scanning it.

Optical scanning unit 142 irradiates a document set on the specified scanning position of document table 146 or transported to the location by the ADF with a light source such as a fluorescent lamp and the like, converts reflected lights from the document surface into electrical signals with the help of light sensitive devices such as CCD or CIS, and generates image data (bitmap data) from the electrical signals.

IC tag reader 143 reads the electronic data recorded on the non-contacting type IC tag of the IC-tagged document to be described later. As the communication system between IC tag reader 143 and the IC tag, those of the international standards such as ISO 14443 and ISO 15693 can be applied using frequency bands such as 135 kHz, 13.56 MHz, and 2.45 GHz. However, the communication systems that can be applied are not limited to those mentioned above, and other known communication systems or proprietary communication systems may be used. The IC tag reader may be able to read all the electronic data recorded on a plurality of IC tags within the communicable range simultaneously.

IC tag reader 143A reads the electronic data recorded on the non-contacting type IC tag of the IC-tagged document set on document tray 145. In order to prevent IC tag reader 143A from detecting by mistake IC tags existing in the vicinity of MFP 10A, other than the tags of the IC-tagged document set on document tray 145, it is designed specifically for short distance communications within a proper distance range, for example, within several centimeters to several tens of centimeters.

IC tag reader 143B reads electronic data recorded on non-contacting type IC tags of the IC-tagged document transported to the specified scanning position of document table 146 by ADF 141. In order to prevent IC tag reader 143B from detecting by mistake IC tags existing in the vicinity of, but not mounted on the IC-tagged document transported to document tray 146 by ADF 141, it is designed specifically for short distance communications within a proper distance range, for example, within several millimeters to several tens of centimeters. A metallic plate is provided between ADF 141 and document table 146 to prevent wireless communications between them in such a way that IC tag reader 143A cannot detect the IC tags of the IC-tagged document on document table 146, while IC tag reader 143B cannot detect the IC tags of the IC-tagged document on document table 145.

Input interface 144 is an interface for receiving input such as image data from external equipment, for which local connection interfaces, e.g., network interfaces such as Ethernet®, Token Ring, and FDDI standards, serial interfaces such as USB and IEEE 1394, parallel interfaces such as SCSI, IEEE 1284, and wireless communication interfaces such as Bluetooth, IEEE 802.11, HomeRF, IrDA, as well as telephone circuit interfaces for connection to telephone circuits can be used.

Image output unit 150 consists of printing unit 151, IC tag writer 152, output interface 153, etc.

Printing unit 151 prints image data to printing paper by the electronic photography method through the steps of electric charging, exposure, development, transfer and fixing, and discharges the printed paper to a paper discharge tray 154.

IC tag writer 152 is used to write electronic data on non-contacting type IC tags on the IC-tagged printing paper to be described later. A device designed for short distance communications similar to the one for IC tag reader 143B is used as IC tag writer 152, and the system for communications between IC tag writer 152 and IC tags can be similar to the one used for IC tag readers 143A and 143B.

Output interface 153 is an interface for transmitting image files to external equipment and an interface similar to said input interface 144 can be used.

Because of the abovementioned constitutions, MFP 100A has all of the functions as a scanner for scanning the document and transmitting image data to external equipment, as a printer for printing the image data received from external equipment, as a copying machine for scanning the document image and printing it, and as a facsimile machine for receiving and transmitting image data through telephone circuits.

MFP 100 may contain constitutional elements other than those described above, or may not include a portion of the above mentioned elements. In this embodiment, for example, image input unit 140 does not necessarily have to have input interface 144, and output unit 150 does not have to have output interface 153.

Figure 3:
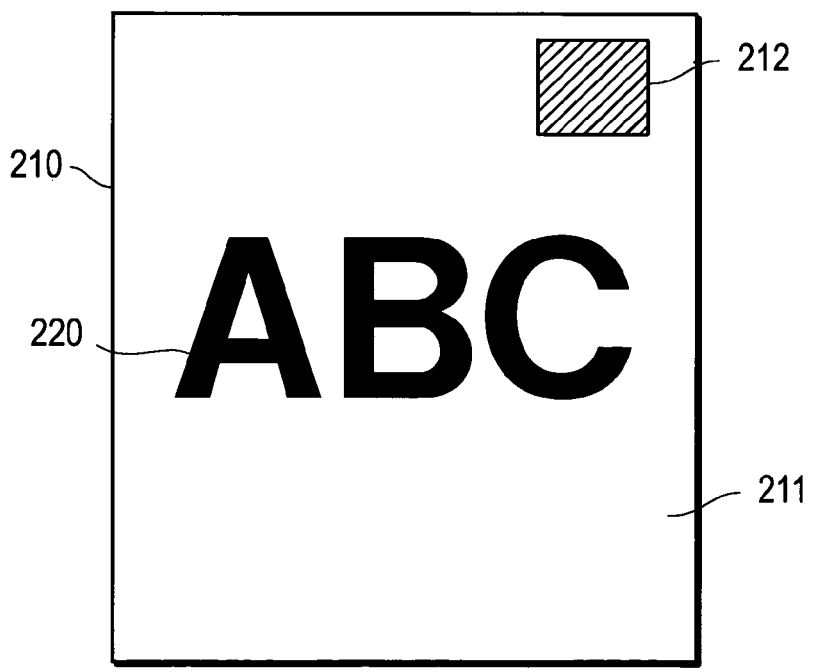
FIG. 3 is a schematic diagram showing a constitution of a IC-tagged document 200.

Next, let us describe the IC-tagged document according to this embodiment referring to FIG. 3 and FIG. 4. FIG. 3 is a schematic diagram showing a constitution of an IC-tagged document 200 according to this embodiment. As shown in FIG. 3, IC-tagged document 200 has an image 220 printed on IC-tagged printing paper 210 wherein an IC tag 212 is embedded on a part of printing paper 211, and image data (original image data) concerning image 220 is recorded on IC tag 212 of IC-tagged document 200.

Printing paper 211 is a printing medium of a sheet form made of paper, cloth, plastic material, metal or others.

IC tag 212 is a non-contacting type electronic tag using wireless communication equipped with a memory unit (not shown) consisting of IC chips and an antenna unit (not shown) consisting of a coil built inside the chip, conducts wireless communications with IC tag readers 143A and 143B, or IC tag writer 152 by means of electromagnetic induction coupling receiving radio waves emitted by IC tag readers 143 and IC tag writer 152 to read and write electronic data. With the development of minute IC tags with a typical thickness of 0.25 mm, which can be embedded in printing paper, in recent years, it is expected that a large amount of information will soon be stored in IC tags as the memory capacities of IC chips are increasing rapidly. However, the electronic tag used in the present invention does not have to be a non-contacting type of tag mentioned above but rather can be any type of tag as long as it has a communication interface for transmitting and receiving electronic data and has a memory unit for storing electronic data, so that even a contact type IC tag that communicates through a contact point type communication interface can be used.

FIG. 4 is a diagram for describing the contents of the electronic data stored in IC tag 212. As can be seen from FIG. 4, the memory unit of IC tag 212 stores electronic data 300. Electronic data 300 is described in the XML format, and contains a header part 310 storing attribute information of IC-tagged document 200 such as a document ID specific to the document, a page number, whether it is allowed to make copies or not, and an image data part 320 storing the original image data concerning image 220 printed on IC-tagged printing paper 210. However, the type of the information and the format of the electronic data recorded on IC tag 212 are not limited to those examples.

Further, IC-tagged printing paper 210 shown in FIG. 3 is not limited to the format shown in the figure; for example, IC tag 212 can be as large as to cover substantially the entire surface of printing paper 211, or a plurality of IC tags 212 are distributed substantially over the entire surface of printing paper 211 to be embedded therein.

Figure 5:
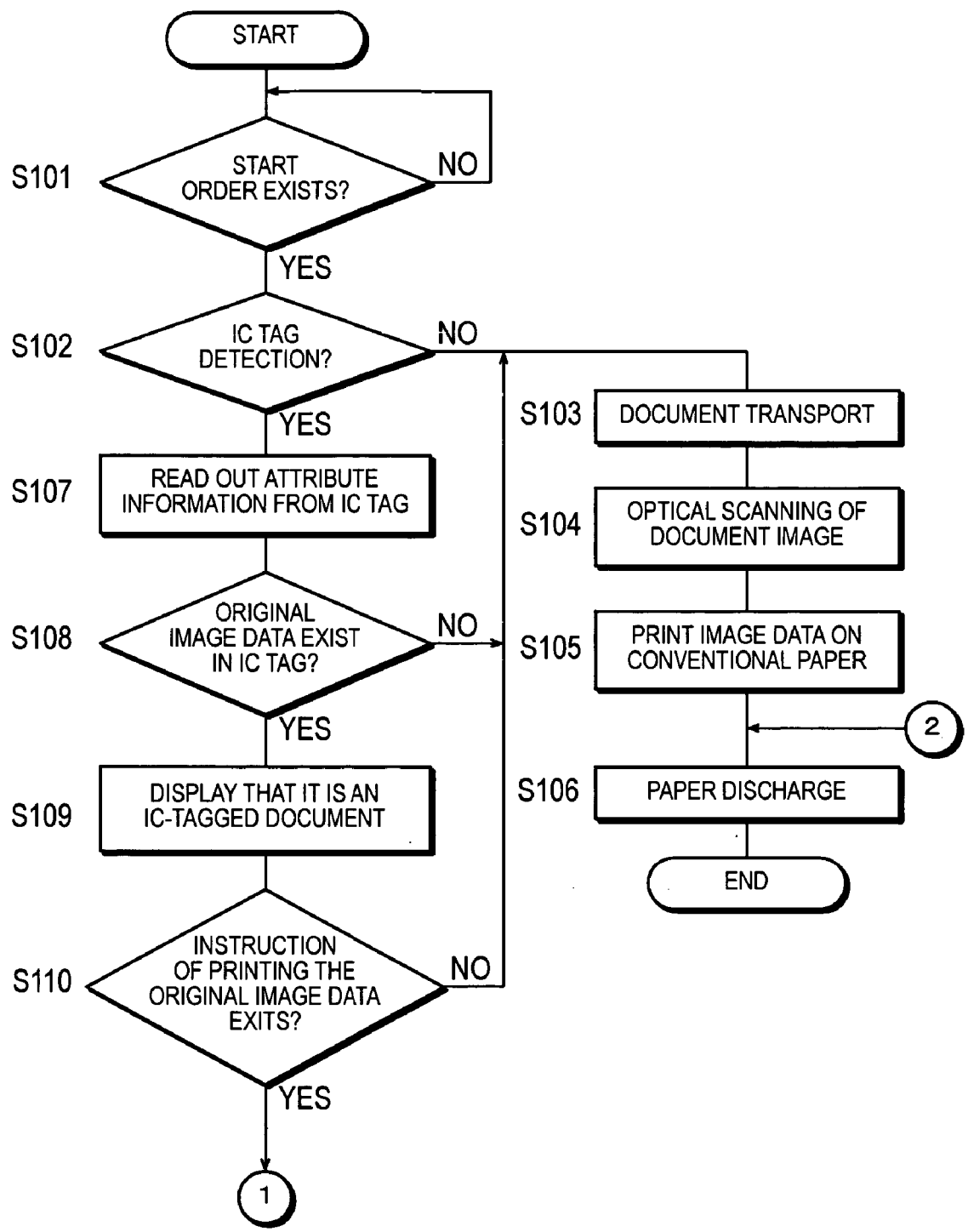
FIG. 5 is a flowchart showing the sequence of image forming process by means of MFP 100A.
Figure 6:
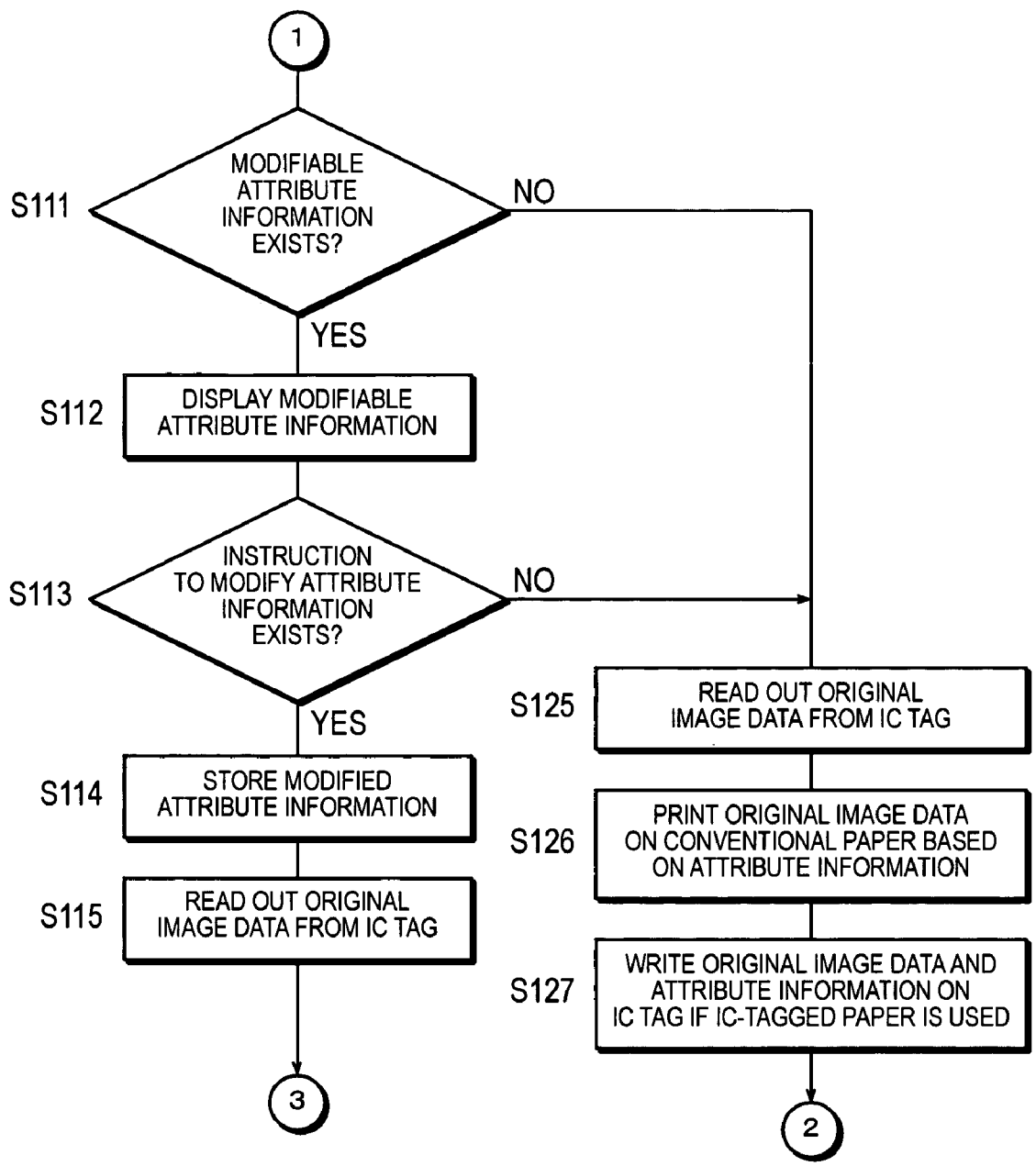
FIG. 6 is a flowchart showing the sequence of image forming process by means of MFP 100A.
Figure 7:
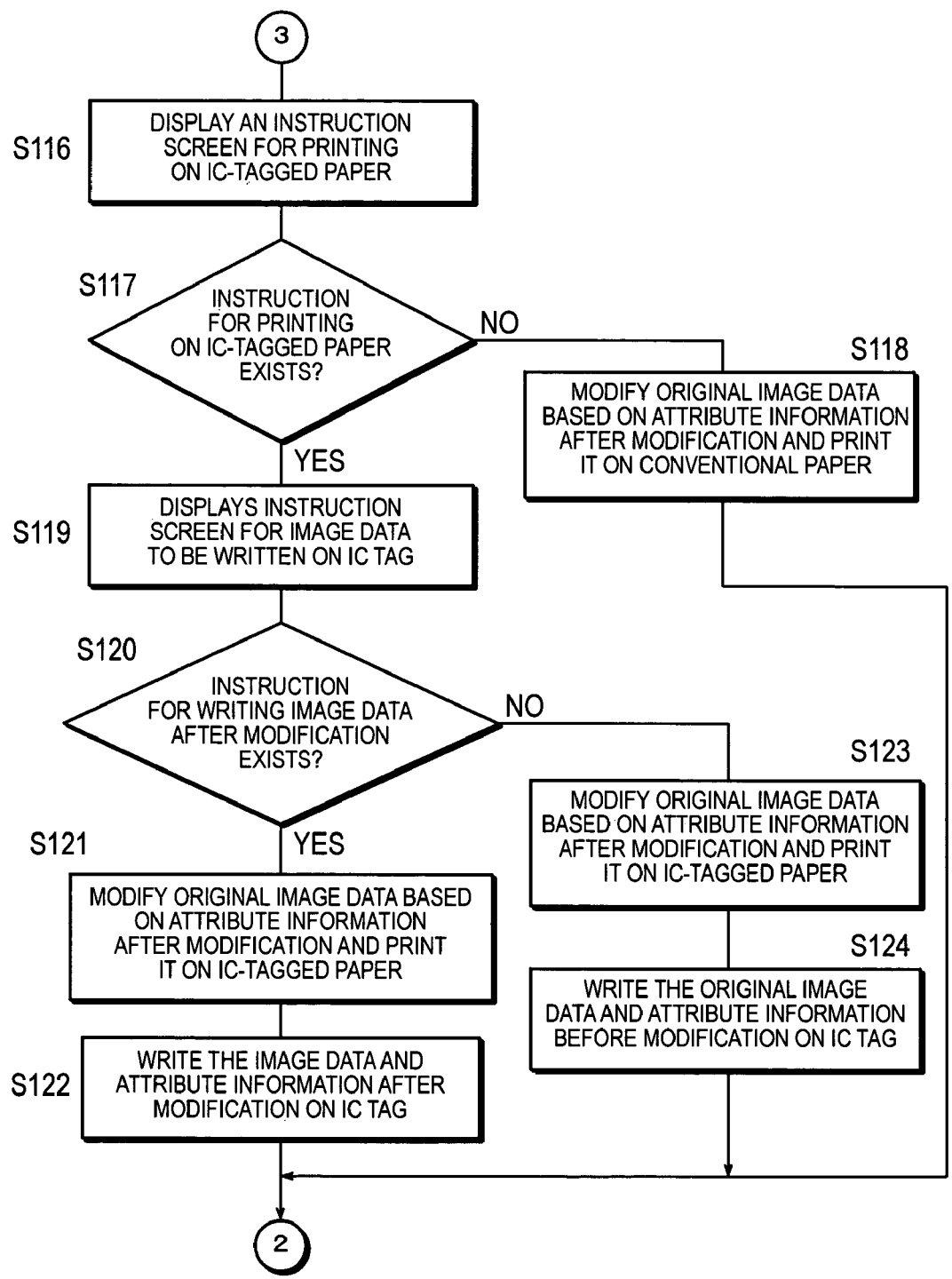
FIG. 7 is a flowchart showing the sequence of image forming process by means of MFP 100A.

Next, the outline of the operation of MFP 100A according to this embodiment will be described below. FIG. 5-FIG. 7 represent a flowchart showing the image forming process of MFP 100A according to this embodiment. The algorithm indicated by the flowchart of FIG. 5-FIG. 7 is stored as a control program on memory 120 of MFP 10A, read out and executed by control unit 110 when the operation starts.

In FIG. 5, MFP 100A stands by until it is ordered to start image processing (S101: No). The user sets the document on document tray 145, specifies the printing condition such as the number of copies to be printed and the type and size of printing paper, and presses the start key from operating unit 130.

Upon receiving an instruction for startup from operating unit 130 (S101: Yes), MFP 100A searches IC tag of the document set on document tray 145 by means of IC tag reader 143A, and makes a judgment whether the document is an IC-tagged document or not (S102). If IC tag is not detected in step S102, it judges that the document set on document tray 145 is a conventional document (S102: No), transports the document set on document tray 145 to the specified scanning position of document table 146 by means of ADF 141 (S103), scans the document image by optical scanning unit 142 and converts it to image data (S104), prints it on conventional paper according to the printing condition by means of printing unit 151 (S105), and discharge the printed paper into discharge tray 154 (S106).

If IC tags are detected in step S102, it judges that the document set on document tray 145 is an IC-tagged document (S102: Yes), and reads the attribute information of said document by means of IC tag reader 143A from the IC tag of the IC-tagged document set on document tray 145 to store it into memory unit 120 (S107). It further makes a judgment whether the original image data is stored in the IC tag of the IC tagged document by means of IC tag reader 143A or not (S108); if there is no original image data stored in the IC tag (S108: No), it transports the document, optically scans the document image, and prints the image data thus obtained same as in the case of a conventional document (S103-S106).

If it is detected that the original image data is stored in the IC tag in step S108 (S108: Yes), it displays on the touch panel of control unit 130 as a screen 410 of FIG. 8 that the document is an IC-tagged document and its original image data is stored in the IC tag and usable (S109), and accepts an instruction on whether the original image data on the IC tag is to be printed or not (S110). If it receives an instruction for not printing the original image data (S110: No), it transports the document, optically scans the document image, and prints the image data thus obtained same as in the case of a conventional document (S103-S106).

On the other hand, if it receives an instruction input for printing the original image data in step S110 (S110: Yes), it advances to step S111, and makes a judgment as to whether there is any attribute information that is modifiable among the attribute information acquired in step S107 or not (Sill). In some cases, the attribute information stored on the IC-tagged document may contain attribute information that is modifiable, and the attribute information includes infroamtion indicating the modifiable attribute information. MFP 100A is capable of judging whether there is any modifiable attribute information by retrieving such information from the acquired attribute information. For example, in case of electronic data 300 of FIG. 4, it is shown that, of the attribute information of "modifiable attribute" tab, image data color, resolution, font size, font color, and font type are modifiable.

If there is any modifiable attribute information among attribute information in step S111 (S111: Yes), it displays the modifiable attribute information on the touch panel of operating unit 130 (S112) as shown in screen 420 of FIG. 9, and accepts an instruction input specifying whether to modify such attributes or not (S113). If it receives an instruction for modifying the attribute information in step S113 (S113: Yes), it displays an attribute information modification input screen on the touch panel of operating unit 130 for accepting attribute information modification input as a screen 430 shown in FIG. 10, and stores the attribute information after the modification on memory unit 120 (S114) Screen 430 of FIG. 10 shows a case where the modifiable attribute information is entered by changing the image data color from "full color" to "gray scale," the resolution from "600 dpi" to "200 dpi," and the font type from "Gothic" to "P Gothic."

Figure 11:
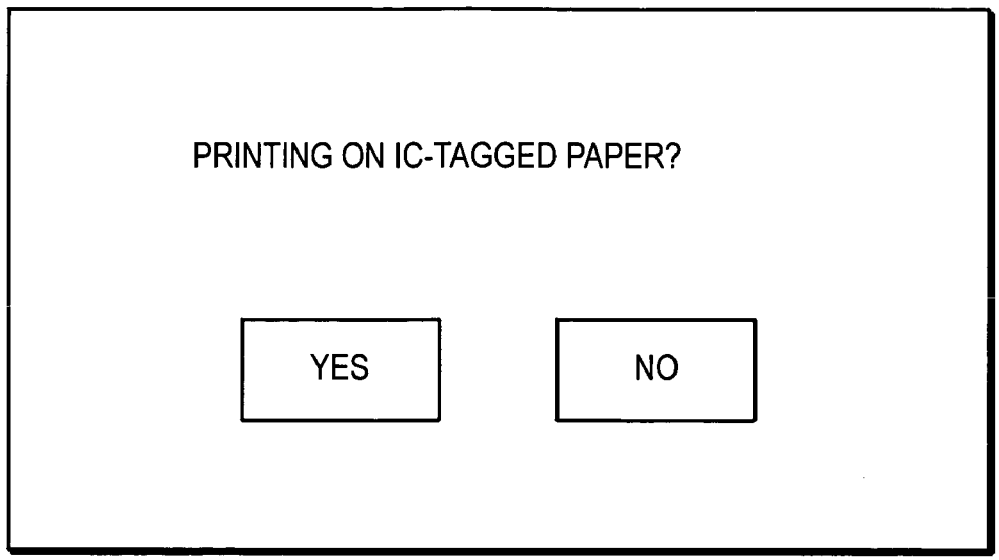
FIG. 11 is an example screen to be displayed on a touch panel of operating unit 130 of MFP 100A.

It then reads the original image data from the IC tag of the IC-tagged document set on the document tray 145 by means of IC tag reader 143A and stores it to memory unit 120 (S115). The program then advances to step S116, displays a printing instruction input screen for printing on IC-tagged printing paper on the touch panel of operating unit 130 as shown in screen 440 of FIG. 11 (S116), and accepts an instruction input of whether it should be printed on the IC-tagged printing paper or not (S117). On the other hand, if no instruction for printing on IC-tagged printing paper is received in step S117 (S117: No), it prints the modified image data based on the attribute information modified in step S113 on conventional printing paper by means of printing unit 151 (S118), and discharges the printed paper to discharge tray 154 (S106).

Figure 12:
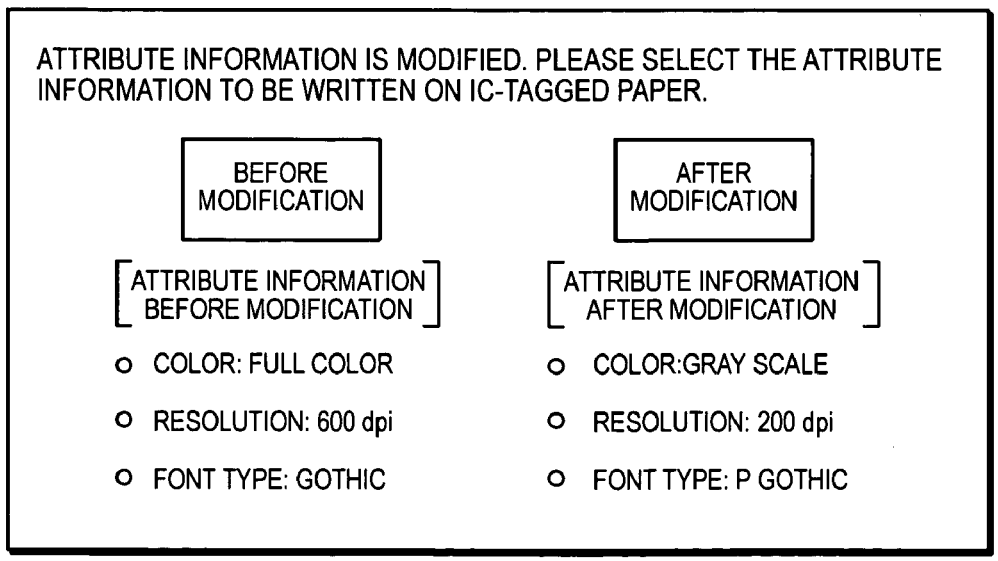
FIG. 12 is an example screen to be displayed on a touch panel of operating unit 130 of MFP 100A.

On the other hand, if there is a printing instruction for printing on IC-tagged printing paper in step S117 (S117: Yes), an instruction input screen for attribute information to be written on the IC tag on IC-tagged printing paper is displayed on the touch panel of operating unit 130 as exemplified in a screen 450 of FIG. 12 (S119), and an instruction input specifying to write on the IC tag either the attribute information after the modification in step S113 or the attribute information before the modification is accepted (S120). The setup contents before and after the modification concerning the modified attribute information are also displayed on screen 450 of FIG. 12 simultaneously, so that the user can check the modification contents of the attribute information first and then specify which of the attribute information, either before or after the modification, to be written on the IC tag.

If an instruction for writing the attribute information after the modification is received in step S120 (S120: Yes), it modifies the original image data based on the attribute information after the modification and prints it on IC-tagged printing paper by means of printing unit 151 (S121), further writes the image data and the attribute information after the modification on the IC tag by means of IC writer 152 (S122), and discharges the printed paper to discharge tray 154 (S106). FIG. 13 is a diagram for describing electronic data recorded on the IC tag of IC-tagged printing paper in step S122. As shown in FIG. 13, what is recorded on the IC tag of IC-tagged printing paper is the electronic data containing the attribute information after the modification in step S113 and the image data reflecting it, in other words, electronic data 310 wherein the changes are made in the image data color from "full color" to "gray scale," in the resolution from "600 dpi" to "200 dpi," and in the font type from "Gothic" to "P Gothic" compared to electronic data 300 (see FIG. 4) recorded on the IC tag of the original document.

If an instruction for writing the attribute information before the modification is received in step S120 (S120: No), it modifies the original image data based on the attribute information after the modification and prints it on IC-tagged printing paper (S123), further writes the image data and the attribute information before the modification on the IC tag (S124), and discharges the printed paper (S106). In other words, in step S124, electronic data 300 (see FIG. 4) recorded on the IC tag of the document is recorded on the IC tag of IC tagged printing paper as is. This makes it possible, for example, in a case of copying IC-tagged printed matters having full color image data by means of a MFP or similar equipment that is capable of monochromatic printing only, wherein the image data is printed on IC-tagged printing paper by changing it from full color to monochromatic, to hold the original full color image data in the IC tag, so that the attribute information and the image data of the original document can be retained intact on the copied print.

It can also be constituted in such a way as to write on the IC tag of IC-tagged printing paper information indicating that there is a difference between the attribute information stored in the IC tag and the printed image data in addition to writing the attribute information and the original image data in step S124. FIG. 14 is a diagram for describing the electronic data recorded on the IC tag of IC-tagged printing paper in such a case. As shown in FIG. 14, the "different attribute" tab is added in case of electronic data 320 in addition to the attribute data of electronic data 300 (see FIG. 4), indicating that image data printed on IC-tagged printing paper contains image data's color, resolution, and font types modified from the attribute information recorded on the IC tag. This makes it possible for the user who wants to use the printed matter later to know the abovementioned printing history of the printed matter by referring to the attribute information contained in the IC tag of the printed matter.

Furthermore, in case there is no modifiable attribute information is included in the attribute information in step S111 (S111: No), or there is no instruction for printing on IC-tagged printing paper in step S113 (S113: No), MFP 100A reads the original image data from the IC tag of the document (S125), prints the original image data on IC-tagged printing paper or conventional paper based on the attribute information read in step S107 (S126), further writes the attribute information obtained by reading and the original image data on the IC tag in case of printing on IC-tagged paper (S127), and discharges the printed paper (S106).

Figure 15:
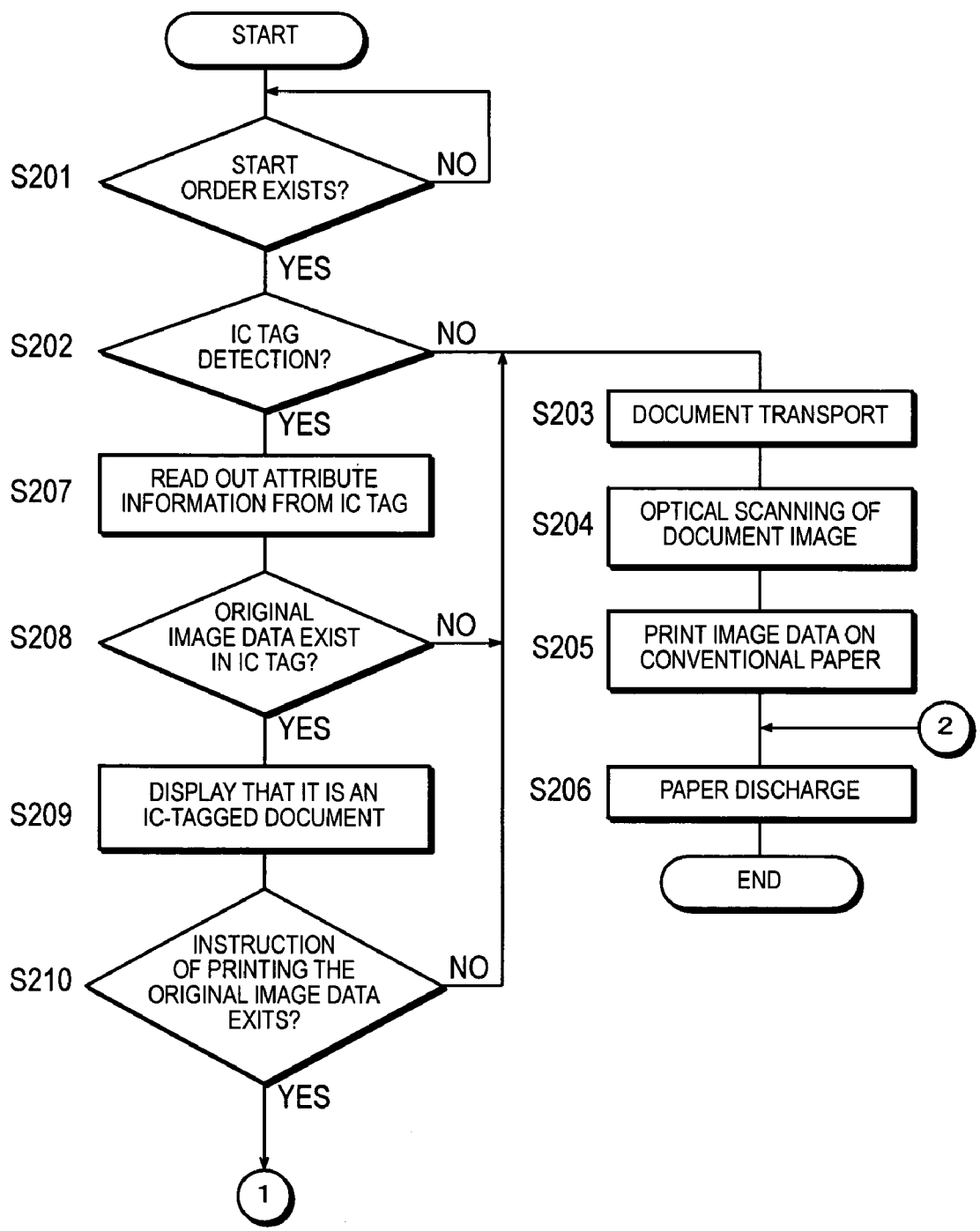
FIG. 15 is a flowchart showing the sequence of image forming process of an MFP 100B concerning a second embodiment of the invention.
Figure 16:
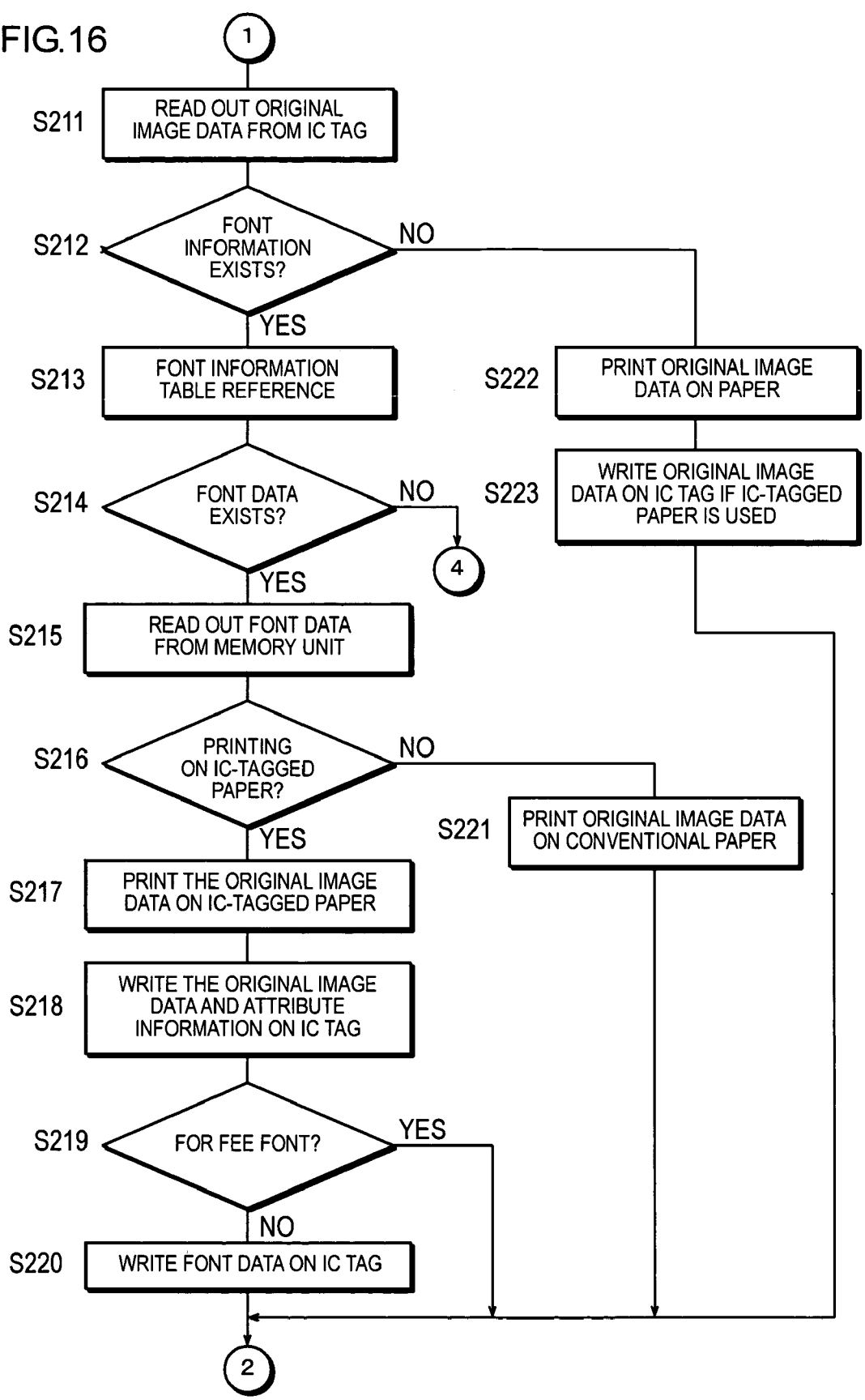
FIG. 16 is a flowchart showing the sequence of image forming process by means of MFP 100B.
Figure 17:
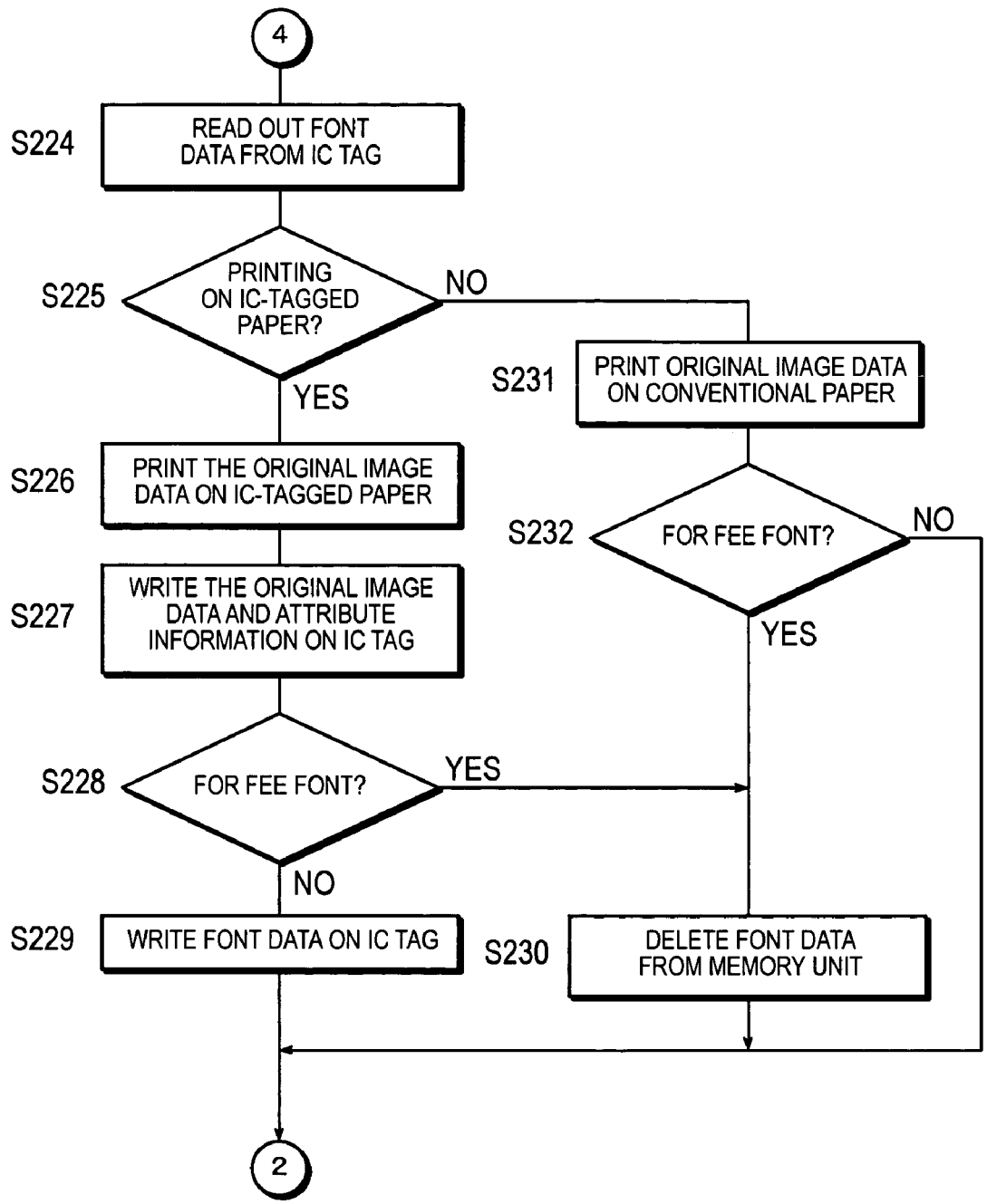
FIG. 17 is a flowchart showing the sequence of image forming process by means of MFP 100B.

Next, the outline of the actions of MFP 100B according to the second embodiment of the present invention will be described. MFP 100B is assumed here to have a similar constitution as MFP 100A according to said first embodiment (see FIG. 1 and FIG. 2). FIG. 15 and FIG. 17 represent a flowchart showing the image forming process of MFP 100B according to this embodiment. The algorithm indicated by the flowchart of FIG. 15-FIG. 17 is stored as a control program on memory 120 of MFP 100B, read out and executed by control unit 110 when the operation starts.

In FIG. 15, MFP 100B stands by until it is ordered to start image processing (S201: No). The user sets the document on document tray 145, specifies the printing condition such as the number of copies to be printed and the type and size of printing paper, and presses the start key from operating unit 130.

Upon receiving an instruction input for startup from operating unit 130 (S201: Yes), MFP 100B searches IC tag of the document set on document tray 145 by means of IC tag reader 143A, and makes a judgment whether the document is an IC-tagged document or not (S202). If IC tag is not detected in step S202, it judges that the document set on document tray 145 is a conventional document (S202: No), transports the document set on document tray 145 to the specified scanning position of document table 146 by means of ADF 141 (S203), scans the document image by optical scanning unit 142 and converts it to image data (S204), prints it on conventional paper according to the printing condition by means of printing unit 151 (S205), and discharge the printed paper into discharge tray 154 (S206).

If IC tag is detected in step S202, it judges that the document set on document tray 145 is an IC-tagged document (S202: Yes), and reads the attribute information of said document by means of IC tag reader 143A from the IC tag of the IC-tagged document set on document tray 145 to store it into memory unit 120 (S207). It further makes a judgment whether the original image data is stored in the IC tag of the IC tagged document by means of IC tag reader 143A or not (S208); if there is no original image data stored in the IC tag (S208: No), it transports the document, optically scans the document image, and prints the image data thus obtained same as in the case of a conventional document (S203-S206).

If it is detected that the original image data is stored in an IC tag in step S208 (S208: Yes), it displays on the touch panel of control unit 130 as a screen 410 of FIG. 8 that the document is an IC-tagged document and its original image data is stored in the IC tag and usable (S209), and accepts an instruction on whether the original image data on the IC tag is to be printed or not (S210). If it receives an instruction for not printing the original image data (S210: No), it transports the document, optically scans the document image, and prints the image data thus obtained same as in the case of a conventional document (S203-S206).

On the other hand, if it receives an instruction input for printing the original image data in step S210 (S210: Yes), it proceeds to step S211, reads the original image data from the IC tag of an IC-tagged document set on document tray 145 by means of IC tag reader 143A and saves it to memory unit 120 (S211), and makes a judgment as to whether font information is contained in the original image data (S212).

If it is judged in step S212 that the original image data contains font information (S212: Yes), it refers to the font information table stored in memory unit 120 (S213), and makes a judgment as to whether MFP 100B has the font data related to the font information or not, and whether the font relate to the font information is for a fee or for free of charge (S214). FIG. 18 is an example of the font information table stored in memory unit 120 of MFP 100B in this embodiment. As shown in FIG. 18, a font information table 500 stores information about font types, information as to whether the font is for a fee or free of charge, and information as to whether MFP 100B has the font data of the font or not.

If it is judged in step S214 that MFP 100B is storing the font data concerning the font information (S214: Yes), it reads the font data concerning the font information from memory unit 120 (S215), displays on the touch panel of operating unit 130 a printing instruction input screen instructing to print on IC-tagged printing paper as exemplified in screen 440 of FIG. 11, and receives an input specifying whether to print it on IC-tagged printing paper or not (S216).

If there is a printing instruction for printing on IC-tagged printing paper in step S216 (S216: Yes), the original image data read in step S211 is printed by means of printing unit 151 based on the attribute information read in step S207 on IC-tagged printing paper using the font data read in step S215 (S217), and the attribute information and the original image data are written into the IC tag of IC-tagged printing paper by means of IC tag writer 152 (S218). Furthermore, if the font related to the font information is free of charge (S219: No), the font data read in step S215 is written into the IC-tag of IC-tagged printing paper (S220), while if the font related to the font information is for a fee (S219: yes), the printed paper is discharged to paper discharge tray without writing the font data into the IC tag (S206).

This provides a means of preventing unauthorized copying of fonts offered for fees, i.e., infringement of copyrights of fonts, in printing IC-tagged documents on IC-tagged printing paper using MFP 100B, as even when printing is performed using font data offered for a fee that is stored in MFP 100B, it does not copy the font data into the IC tag of IC-tagged printing paper.

If there is no printing instruction for printing on IC-tagged printing paper in step S216 (S216: No), the original image data read in step S211 is printed by means of printing unit 151 based on the attribute information read in step S207 on conventional printing paper using the font data read in step S215 (S221), and the printed paper is discharged to paper discharge tray 154 (S206). If it is judged in step S212 that the original image data does not contain font information (S212: No), the original image data read in step S211 is printed by means of printing unit 151 based on the attribute information read in step S207 on conventional printing paper (S222), further the attribute information and the original image data are written into the IC tag in case of printing on IC-tagged printing paper (S223), and the printed paper is discharged to paper discharge tray (S206).

On the other hand, if it is judged in step S214 that MFP 100B does not store the font data concerning the font information (S214: No), the system advances to step S224, reads the font data concerning the font information from the IC tag of IC-tagged document current set in document tray 145 by means of IC tag reader 143A and writes it on memory unit 120 (S224), displays on the touch panel of operating unit 130 a printing instruction input screen instructing to print on IC-tagged printing paper to accept and receives an input for instructing whether to print it on IC-tagged paper or not (S225).

If there is a printing instruction for printing on IC-tagged printing paper in step S225 (S225: Yes), the original image data read in step S211 is printed by means of printing unit 151 based on the attribute information read in step S207 on IC-tagged printing paper using the font data read in step S224 (S226), and the attribute information and the original image data are written into the IC tag of IC-tagged printing paper by means of IC tag writer 152 (S227). Furthermore, if the font related to the font information is free of charge (S228: No), the font data read in step S224 is written into the IC-tag of IC-tagged printing paper (S229), while if the font related to the font information is for a fee (S228: yes), the font data is deleted from memory unit 120 without being written into the IC tag (S230), and the printed paper is discharged to paper discharge tray (S206).

If there is no printing instruction for printing on IC-tagged printing paper in step S225 (S225: No), the original image data read in step S211 is printed by means of printing unit 151 based on the attribute information read in step S207 on conventional printing paper using the font data read in step S224 (S231), the font data is deleted from memory unit 120 (S230) if the font related to the font information is for a fee (S232: Yes), and the printed paper is discharged to paper discharge tray 154 (S206).

This provides a means of preventing unauthorized copying of fonts offered for fees, i.e., infringement of copyrights of fonts, in copying IC-tagged documents on IC-tagged printing paper or normal paper using MFP 100B, as it deletes after the printing the font data that has been read and stored into memory unit 120 of MFP 100B, even when the printing is performed using font data offered for a fee that is stored in IC-tagged document.

The invention is not limited to the embodiment described above, but also can be changed in various ways within the scope of the claims.

For example, in each of the embodiments described above, image output unit 150 can be so constituted not just to print the image data on IC-tagged printing paper or conventional printing paper by means of printing unit 151 or to write it on the IC tag of the IC-tagged printing paper by means of IC tag writer 152, but also to transmit it to external equipment via output interface 153.

Although MFP is used as an example of the image forming device according to the present invention, MFP 100A and MFP 100B can be copying machines dedicated for copying IC-tagged printed matters (copying to conventional printing paper from IC-tagged printed matters) or copying machines dedicated for preparing IC-tagged printed matters (copying to IC-tagged printing paper from IC-tagged printed matters).

The image forming method and the image forming device according to this invention can be realized by a dedicated hardware circuit for executing the abovementioned steps, or by causing a CPU to execute a program where said steps are described. If the present invention is to be materialized by the latter means, said programs for operating the image forming device can be provided by computer-readable recording media such as a floppy® disk and CD-ROM, or can be provided on-line via a network such as the Internet. In this case, the program recorded on the computer readable recording medium is normally transported to and stored in a memory device such as ROM and a hard disk. The program can also be provided as independent application software or can be built into the software of the image forming device as a part of its function.

According to the image forming device of the present invention, it is possible to obtain electronically tagged printed matter storing the attribute information and the original image data even when the printing is executed on the electronically tagged printing paper after modifying the attribute information of the electronically tagged printed matter, as the attribute information and the image data before the modification are written into the electronic tag of printing paper.

Also, according to the image forming device of the present invention, when printing is made on electronically tagged printing paper changing the attribute information of electronically tagged printed matters, it is possible to obtain electronically tagged printed matter of the user's preference by modifying the contents of the items to be written into the electronic tag, such as when it is desired to synchronize the printed image data and the image data recorded on the electronic tag, or storing the original image data of the document, as it is possible to select the attribute information and the image data, of either before or after the modification, to be written on the electronic tag of he printing paper.

Furthermore, according to the image forming device of the present invention, it is possible to know the printing history, when printing is made on electronically tagged printing paper changing the attribute information of electronically tagged printed matters, by means of referencing the electronic tag when using the electronically tagged printed matters thus obtained, as the information indicating that there is a difference between the attribute information and the image data stored in the electronic tag and the image data printed on the printing paper is written on the electronic tag of the printing paper together with the attribute information and the image data before the modification.

What is claimed is:

1. An image forming device, comprising:
    an attribute information reading unit for reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag;
    a display unit for displaying modifiable items among attribute information read out by said attribute information reading unit;
    an attribute information modifying unit for modifying the attribute information displayed by said display unit;
    an image reading unit for reading out the image data from the electronic tag of said electronically tagged printed matters;
    an image data modifying unit for modifying the image data read out by said image data reading unit based on the attribute information modified by said attribute information modifying unit;
    a printing unit for printing the image data modified by said image data modifying unit on another electronically tagged printing paper equipped with an electronic tag for storing electronic data in a certain part of the another printing paper; and
    a writing unit for writing the attribute information read out by said attribute information reading unit and the image data read out by said image data reading unit on the electronic tag of the another electronically tagged printing paper on which the modified image data is printed by said printing unit.

2. An image forming device as claimed in claim 1 further comprising:
    a selecting unit for selecting to write the attribute information and the image data, either before or after the modifications by said attribute information modifying unit and said image data modifying unit respectively, on the electronic tag of the another electronically tagged printing paper on which the modified image data is printed by said printing unit, wherein
    said writing unit writes the attribute information read out by said attribute information reading unit and the image data readout by said image data reading unit, when a selection is made to write the attribute information and the image data before the modification by said selecting unit.

3. An image forming device as claimed in claim 1, wherein said writing unit further writes information indicating that there is a difference between the attribute information and the image data stored in said electronic tag and the modified image data printed on said another printing paper in the electronic tag of the another electronically tagged printing paper on which the modified image data is printed by said printing unit.

4. An image forming method, comprising:
    an attribute information reading step of reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag;
    a display step of displaying modifiable items among attribute information read out by said attribute information reading step;
    an attribute information modifying step of modifying the attribute information displayed by said display step;
    an image reading step of reading out the image data from the electronic tag of said electronically tagged printed matters;
    an image data modifying step of modifying the image data read out by said image data reading step based on the attribute information modified by said attribute information modifying step;
    a printing step of printing the image data modified by said image data modifying step on another electronically tagged printing paper equipped with an electronic tag for storing electronic data in a certain part of the another printing paper; and
    a writing step of writing the attribute information read out by said attribute information reading step and the image data read out by said image data reading step on the electronic tag of the another electronically tagged printing paper on which the modified image data is printed by said printing step.

5. An image forming method as claimed in claim 4 further comprising:
a selecting step of selecting to write the attribute information and the image data, either before or after the modifications by said attribute information modifying step and said image data modifying step respectively, on the electronic tag of the another electronically tagged printing paper on which the modified image data is printed by said printing step, wherein
said writing step writes the attribute information read out by said attribute information reading step and the image data read out by said image data reading step, when a selection is made to write the attribute information and the image data before the modification by said selecting step.

6. An image forming method as claimed in claim 4, wherein said writing step further writes information indicating that there is a difference between the attribute information and the image data stored in said electronic tag and the modified image data printed on said another printing paper in the electronic tag of the another electronically tagged printing paper on which the modified image data is printed by said printing step.

7. An image forming program, tangibly embodied in a computer-readable storage medium, for causing an image forming device to execute:
an attribute information reading step of reading out attribute information of an electronically tagged printed matter wherein image data is printed on an electronically tagged printing paper equipped with an electronic tag for storing electronic data in a certain part of the printing paper and said electronic tag stores image data printed on said electronically tagged printing paper, from said electronic tag;
a display step of displaying modifiable items among attribute information read out by said attribute information reading step;
an attribute information modifying step of modifying the attribute information displayed by said display step;
an image reading step of reading out the image data from the electronic tag of said electronically tagged printed matters;
an image data modifying step of modifying the image data read out by said image data reading step based on the attribute information modified by said attribute information modifying step;
a printing step of printing the image data modified by said image data modifying step on another electronically tagged printing paper equipped with an electronic tag for storing electronic data in a certain part of the another printing paper; and
a writing step of writing the attribute information read out by said attribute information reading step and the image data read out by said image data reading step on the electronic tag of the another electronically tagged printing paper on which the modified image data is printed by said printing step.

8. The image forming program as claimed in claim 7 for further causing an image forming device to execute:
a selecting step of selecting to write the attribute information and the image data, either before or after the modifications by said attribute information modifying step and said image data modifying step respectively, on the electronic tag of the another electronically tagged printing paper on which the modified image data is printed by said printing step, wherein
said writing step writes the attribute information read out by said attribute information reading step and the image data read out by said image data reading step, when a selection is made to write the attribute information and the image data before the modification by said selecting step.

9. The image forming program as claimed in claim 7, wherein said writing step further writes information indicating that there is a difference between the attribute information and the image data stored in said electronic tag and the modified image data printed on said another printing paper in the electronic tag of the another electronically tagged printing paper on which the modified image data is printed by said printing step.

* * * * *